US007308579B2

(12) United States Patent
Abela (10) Patent No.: US 7,308,579 B2
(45) Date of Patent: Dec. 11, 2007

(54) METHOD AND SYSTEM FOR INTERNATIONALLY PROVIDING TRUSTED UNIVERSAL IDENTIFICATION OVER A GLOBAL COMMUNICATIONS NETWORK

(76) Inventor: Noel Abela, Nectar House, Gistakor Street, Ghaxaq, ZTN 11 (MT)

( * ) Notice: Subject to any disclaimer, the term of this patent is extended or adjusted under 35 U.S.C. 154(b) by 841 days.

(21) Appl. No.: 10/063,062

(22) Filed: Mar. 15, 2002

(65) Prior Publication Data
US 2003/0177356 A1 Sep. 18, 2003

(51) Int. Cl.
*H04L 9/32* (2006.01)
*H04L 9/00* (2006.01)

(52) U.S. Cl. .................. 713/182; 380/278; 705/76
(58) Field of Classification Search ................ 713/182
See application file for complete search history.

(56) References Cited

U.S. PATENT DOCUMENTS

| | | | | |
|---|---|---|---|---|
| 4,575,621 A * | 3/1986 | Dreifus | | 235/380 |
| 5,793,763 A * | 8/1998 | Mayes et al. | | 370/389 |
| 5,799,086 A * | 8/1998 | Sudia | | 705/76 |
| 5,828,832 A * | 10/1998 | Holden et al. | | 726/12 |
| 5,973,731 A | 10/1999 | Schwab | | 348/161 |
| 6,005,939 A | 12/1999 | Fortenberry et al. | | 705/76 |
| 6,064,666 A | 5/2000 | Willner et al. | | 370/352 |
| 6,085,976 A | 7/2000 | Sehr | | 235/384 |
| 6,101,477 A | 8/2000 | Hohle et al. | | 705/1 |
| 6,275,944 B1 * | 8/2001 | Kao et al. | | 726/36 |
| 6,323,771 B1 | 11/2001 | Payne et al. | | 340/573.1 |
| 6,353,812 B2 * | 3/2002 | Frankel et al. | | 705/44 |
| 6,385,651 B2 * | 5/2002 | Dancs et al. | | 709/227 |
| 6,386,451 B1 | 5/2002 | Sehr | | 235/384 |
| 6,611,498 B1 * | 8/2003 | Baker et al. | | 370/252 |
| 6,801,941 B1 * | 10/2004 | Stephens et al. | | 709/225 |
| 7,003,501 B2 * | 2/2006 | Ostroff | | 705/76 |
| 2001/0027520 A1 | 10/2001 | Mori | | 713/186 |
| 2001/0037451 A1 | 11/2001 | Bhagavatula | | 713/155 |
| 2001/0049785 A1 | 12/2001 | Kawan et al. | | 713/156 |
| 2001/0056487 A1 | 12/2001 | Yoo | | 709/225 |
| 2002/0023059 A1 | 2/2002 | Bari et al. | | 705/76 |
| 2002/0053035 A1 | 5/2002 | Schutzer | | 713/202 |
| 2002/0108057 A1 | 8/2002 | Zhanhong et al. | | 713/201 |

OTHER PUBLICATIONS

Postel, RFC 1591, "Domain Name System Structure and Delegation," 1994.*
Eastlake, 3rd, RFC 1750, "Randomness Recommendations for Security," 1994.*

(Continued)

*Primary Examiner*—Matthew Heneghan (57) ABSTRACT

Method for providing an international infrastructure for trusted universal identification over the Internet by using existing resources. Each participating country sets up a national database and server system and imports data from local, official ID data sources which are normally indexed by a unique identifier. Attaching the home country's ISO-3166 code to this identifier, a worldwide unique identifier results ("universal ID" or "uID"). The binding of a group code to uID widens scope to identify other entities. Each country connects its database to the Internet and acts as an authentication and authorization broker to worldwide uID holders. A user, to access securely any uID compliant service on the Internet, may use his/her uID in conjunction with a password or biometric data. It may be used in international, security sensitive areas to produce trusted identity and to securely submit personal details without the burden of filling in forms.

20 Claims, 7 Drawing Sheets

OTHER PUBLICATIONS

Elz, et al., RFC 2181, "Clarifications to the DNS Specifications," 1997.*

Eastlake, RFC 2535, "Domain Name System Security Extensions," 1999.*

Vixie et al., RFC 2845, "Secret Key Transaction Authentication for DNS (TSIG)," 2000.*

Wellington, RFC 3007, "Secure Domain Name System (DNS) Dynamic Update," 2000.*

Cooper et al., RFC 1480, "The US Domain," 1993.*

Michaelson, "Re: The IANA's File of iTLD Requests," 1996.*

Microsoft .net Passport—(http://www.passport.com).

Gardiner Joey, "Sun unviels rival to Microsoft's Passport", silicon.com, Sep. 26, 2001.

Gardiner Joey, "How about an alternative to Microsoft .NET?", silicon.com, Oct. 9, 2001.

Gardiner Joey, "Microsoft not trusted to hold personal data", silicon.com, Oct. 24, 2001.

"Egg at the tip of Passport iceberg", silicon.com editorial, Nov. 2, 2001.

Gardiner Joey, "Microsoft admits 'Passport not secure enough'", silicon.com, Nov. 6, 2001.

Heikkila Pia, "AOL snubs Microsoft Passport", silicon.com, Dec. 6, 2001.

Hu Jim and Wilcox Joe, "Microsoft shows Passport users the money", ZDNet News, Dec. 10, 2001.

Gardiner Joey, "Liberty Alliance: Close but no Seattle software behemoth", silicon.com, Dec. 19, 2001.

Sturgeon Will, "Novell joins Liberty Alliance", silicon.com, Feb. 4, 2002.

"IBM neutral on passport vs. Liberty", ZDNet (UK) news staff, Feb. 25, 2002.

McLean Heather, "Sun's Passport-buster is nothing but 'Solaris dressed up'", silicon.com, Mar. 12, 2002.

Knorr Eric, "Microsoft to cooperate on identity services? Maybe", ZDNet News, Apr. 18, 2002.

Harmon Amy, "Microsoft Denies Any Big Advantage in Online Identity Field", The New York Times, Apr. 19, 2002.

Wilcox Joe, "Customers wary of online Ids", ZDNet News, Apr. 26, 2002.

Morgenstern DAvid, "Who can you trust?No one!", ZDNet News, May 2, 2002.

Mello Adrian, "Mistaken identities", ZDNet News, May 8, 2002.

The Liberty Alliance Project (http://www.projectliberty.org).

"Microsoft—the company which shot the /liberty Alliance?", silicon.com editorial, Dec. 19, 2001.

Kaliya Hamlin, Identity 2.0 Gathering: Getting to the Promised Land Oct. 7, 2005, O' Reilly Policy DevCenter, 3 Pages.

Ryan Naraine, Microsoft Passport Morphs into Windows Live ID Mar. 6, 2005, eWeek Enterprise News & Reviews—(eweek.com).

Eric Norlin, Google's authentication vs. Microsoft's Live ID Jun. 29, 2006, Zdnet blogs, 7 Pages.

Dion Hinchcliffe, Identity 1.x: Microsoft Live ID and Google Accounts Jul. 6, 2006, Zdnet blogs, 7 Pages.

Eric Norlin, Global warming of the identity ocean Feb. 8, 2007, Zdnet blogs, 5 Pages.

* cited by examiner

Variable length ID identifier unique in the country of origin 210
mt.ind.274067M 211
274067M.ind.mt 212
274067M.mt 213
mt.274067M 214
2959027.com.uk

METHOD AND SYSTEM FOR INTERNATIONALLY PROVIDING TRUSTED UNIVERSAL IDENTIFICATION OVER A GLOBAL COMMUNICATIONS NETWORK

BACKGROUND OF INVENTION

The World Wide Web is especially suited to conduct worldwide interactivity. It allows people and all types of organizations to come together in communication, commerce, collaboration and a host of other activities that are only limited by imagination. New services on the Internet are cropping up everyday and the number of users is growing exponentially. Hence, it is normal for any Internet user to be subscribed to many online services.

To subscribe to any Internet service, one normally fills in a lengthy online form and chooses a username and password. This brings about a number of problems. The most obvious is the inconvenience caused by the repetitive typing of one's details every time one wants to subscribe to a new service.

The username of choice is most often than not, already assigned to someone else. Hence it is practically impossible to have the same username for all services. Since security procedures are different for different web sites, it is also not always possible to have the same password for all the services. The most common differences are password length and case sensitivity. Some online subscription procedures do not enable you to choose a password but automatically assign you with one. As a result, one ends up with a myriad of usernames and passwords, most of which one usually forgets. When this happens—and this is one of the most common problems at helpdesks—users usually ask the supplier for their password. This is then sent to them via email, a method that is quite insecure. Some do not even bother to ask for their password and simply re-register. This may resolve the user's problem but for the supplier, this means having a huge amount of repeated and usually useless information in his client database. Having a clean, accurate and focused client database is imperative for effective marketing.

The form-filling hurdle invariably hurts online sales. According to a research published by Jupiter Communications in February 1999, twenty-seven percent of consumers abandon their online carts when faced with having to fill in all the necessary payment, shipping, and billing information.

A number of companies and organizations currently provide initiatives to address this problem. Reference is made to three popular ones. The first is "Microsoft Passport" which is one of the focus points in their Windows XP operating system and .NET strategy. Secondly, AOL, CompuServe and Netscape have their own "Screen Name" and "Quick Checkout". Thirdly, the Liberty Alliance Project is a business alliance formed to deliver and support an identity solution for the Internet that enables single sign-on for consumers as well as business users in an open, federated way.

These technologies serve their purpose well, but cannot make it as a universal Internet identification tool for the following reasons:

The worldwide ID concept should be central, but at the same time cannot be controlled by a single organization, especially if it is a commercial entity. Its power would be so great, that it would be subject to serious concerns about control of the entire Internet. Additionally, a considerable amount of time has to elapse until enough members subscribe. All the above mentioned methods have the same basic weaknesses which are inertia in adoption, inability to interoperate, and the fact that they do not verify true identity. It would take years to wait out all the people in the world to register, and this concept derives its strength from numbers.

If most people in the world had to have one universal identifier, then most online merchants would gladly comply with it. This is because it considerably shortens the road from visiting the web site and pressing the "buy" button for the whole world population and not just for their regular customers. Likewise, every Internet user would love the idea of having whichever site they visit recognizing him or her by using one universal identifier. To make things easier, it would be convenient for this identifier to be submitted through swipe cards, biometrics, and any other practical interface that may be popular at the time.

The fact that there are more than one rival and incompatible systems for online identification, does not bring promise to the realization of this scenario. Every organization does its utmost to outplay the other. Most online merchants would be forced to either choose only one method to comply with and lose out on the other organization's members, or else comply with all systems. The cost and complexity of the latter option would be very discouraging.

Jim Hu and Joe Wilcox describe this situation very well in their Special to ZDNet News dated Dec. 10, 2001. "Although online wallet and authentication software has seen low consumer adoption, it is widely perceived as a competitive choke point of the future, essentially giving the winner a hand in every transaction conducted online"... "As a result, the door is still wide open for competing authentication formats, according to analysts "No one wallet product has been accepted by more than 100 merchants . . . and consumers don't want them because they don't deliver convenience,"said James Van Dyke, an analyst at Jupiter Media Metrix. 'It's a chicken-or-the-egg syndrome.'"

SUMMARY OF INVENTION

An embodiment of the present invention provides a method and system for making available a universal unique identifier to practically every person and any other entity in the world. This can be used to identify oneself on a worldwide network such as the Internet. This universal identifier, which from now on shall also be referred to as "uID", can be used along with a secret password or some other digital secrets and signatures by its holder to login and interact with all compliant web sites. It can be used to produce a trusted identity when it is asked for and to submit one's details securely and conveniently without the hassle of filling in a form every time. The uID concept can be achieved by having every participating nation set up its own uID national database and server system. This is then connected to a worldwide network such as the Internet. The uID server system thus created should have the authority to gain access to its country's official national database and its regular updates. This official source of data could be anything from a passport, driving license, ID card, electoral register, or birth certificate database. All developed and most developing countries have, and scrupulously maintain, at least one such database where all records have an identifier, unique to that particular country.

By prefixing or suffixing this identifier with a country code (for example the two-letter country code as defined in the ISO-3166 standard), we would end up with a worldwide unique identifier. Since it is very likely that this model may be useful to identify other entities besides individuals, a group code can be added as the third part of this uID identifier. Based on this new identifier and the bona fide data in the national database, the uID local authority can build and maintain its own database. Such an authority should not, however, have the authority to modify this imported data. Every country's uID database will act as an authentication and authorization broker. It will also have a directory function serving out information (like names, addresses, photos, etc.) mapped to each of its local uID identifiers when requested by other worldwide uID members who are authorized to receive this information. The database structures and technological standards should be governed by a global uID authority represented by member countries. All member countries would be expected to strictly comply with these standards in order to ensure interoperability. Ideal examples of current standards that could be employed, are HTTP (Hypertext Transfer Protocol) and XML (Extensible Markup Language). Other significant emerging standards are UDDI (Universal Description Discovery and Integration), and SOAP (Simple Object Access Protocol). The brand of database and software technology implemented should be at the country's discretion as long as it embraces these standards. The present invention puts an end to the stalemate situation of the prior art and addresses their weaknesses.

Objects and Advantages

Accordingly, several objects and advantages of the present method for online identification are:

(a) to provide an electronic worldwide identification system to which practically all the world population can become member very quickly by making use of existing official data resources. Data collection is avoided and no inertia is manifested in its wide adoption. This can promote further the use of the Internet.

(b) to provide an electronic worldwide identification system that everyone naturally feels familiar with, since everyone is already familiar with his or her ID card, passport or driving license number. All one has to do is to add his or her country code to it. Even this is familiar to many, since most people using the Internet already know their country's code, seeing it all the time on their e-mail address and the web sites they visit regularly.

(c) to provide an electronic worldwide identification system where the data has been meticulously verified since it originates from official sources. Identities are more easily verified in their country of source compared to "anybody" anonymously signing up online. Therefore, this method should significantly reduce false identities and fraud. Since individuals as well as merchants feel more confident dealing with an "official" identity, financial activity on the Internet would be greatly encouraged.

(d) to provide an electronic worldwide identification system that can be integrated to, and automatically updated from its official data source to reflect any changes effected to personal details such as addresses or even photographs. Automatic updates may also support the creation of new records and the deletion of terminated ones.

(e) to provide an electronic worldwide identification system that will decentralize the responsibility and its subsequent power from a single data repository to a distributed system where every country or region is responsible for its area's uID database and server system.

(f) to provide an electronic worldwide identification system where reliability is enhanced since every country would be responsible for its own server. The fact that any particular country's uID server is down does not mean that the whole international service is down along with it.

(g) to provide an electronic worldwide identification system that will discourage monopoly, since every country's uID authority will be free to choose its own database technology as long as it can comply with all the standards set out by a global uID authority and fully interoperate with the other countries' uID server and client systems.

(h) to provide an electronic worldwide identification system ready for an age when telephone, cellular telephone, fax, email and any other novel means of Peer-To-Peer communication converge into one. At that stage, the uID identifier could be the only number one needs to be able to communicate.

(i) to provide an electronic worldwide identification system that renders customer or member databases of compliant organizations more efficient and cheaper to manage since any changes made to the uID record in the uID database would automatically be reflected in their customer or member record in their database.

(j) to provide an electronic worldwide identification system that would still allow anonymous browsing of the Internet but would exclude anonymous execution of security sensitive activities.

(k) to provide an electronic worldwide identification system that satisfies all three long-term goals of the World Wide Web Consortium (http://www.w3.org) namely:

1. Universal Access: To make the Web accessible to all by promoting technologies that take into account the vast differences in culture, education, ability, material resources, and physical limitations of users on all continents;

2. Semantic Web: To develop a software environment that permits each user to make the best use of the resources available on the Web;

3. Web of Trust: To guide the Web's development with careful consideration for the novel legal, commercial, and social issues raised by this technology.

(l) to provide an electronic worldwide identification system that fits correctly in the World Wide Web Consortium's Design Principles of the Web (with special emphasis on points 3 and 1 in that order) namely:

1. Interoperability: Specifications for the Web's languages and protocols must be compatible with one another and allow (any) hardware and software used to access the Web to work together.

2. Evolution: The Web must be able to accommodate future technologies. Design principles such as simplicity, modularity, and extensibility will increase the chances that the Web will work with emerging technologies such as mobile Web devices and digital television, as well as others to come.

3. Decentralization: Decentralization is without a doubt the newest principle and most difficult to apply. To allow the Web to "scale" to worldwide proportions while resisting errors and breakdowns, the architecture (like the Internet) must limit or eliminate dependencies on central registries.

Further objects and advantages of the present invention will become apparent from a consideration of the drawings and ensuing descriptions.

DETAILED DESCRIPTION

The present invention is a method and system for universally identifying a person, organization or any other entity over a worldwide communications network such as the Internet. It eliminates the need of filling in an online form to register oneself for a particular online service. The present method and system provides identity that is official and hence should be trustworthy to the public eye. It is also a distributed system, which makes it more reliable and its data more secure than in a central system. It shall also be referred to as the uID paradigm or uID concept.

Figure 1:
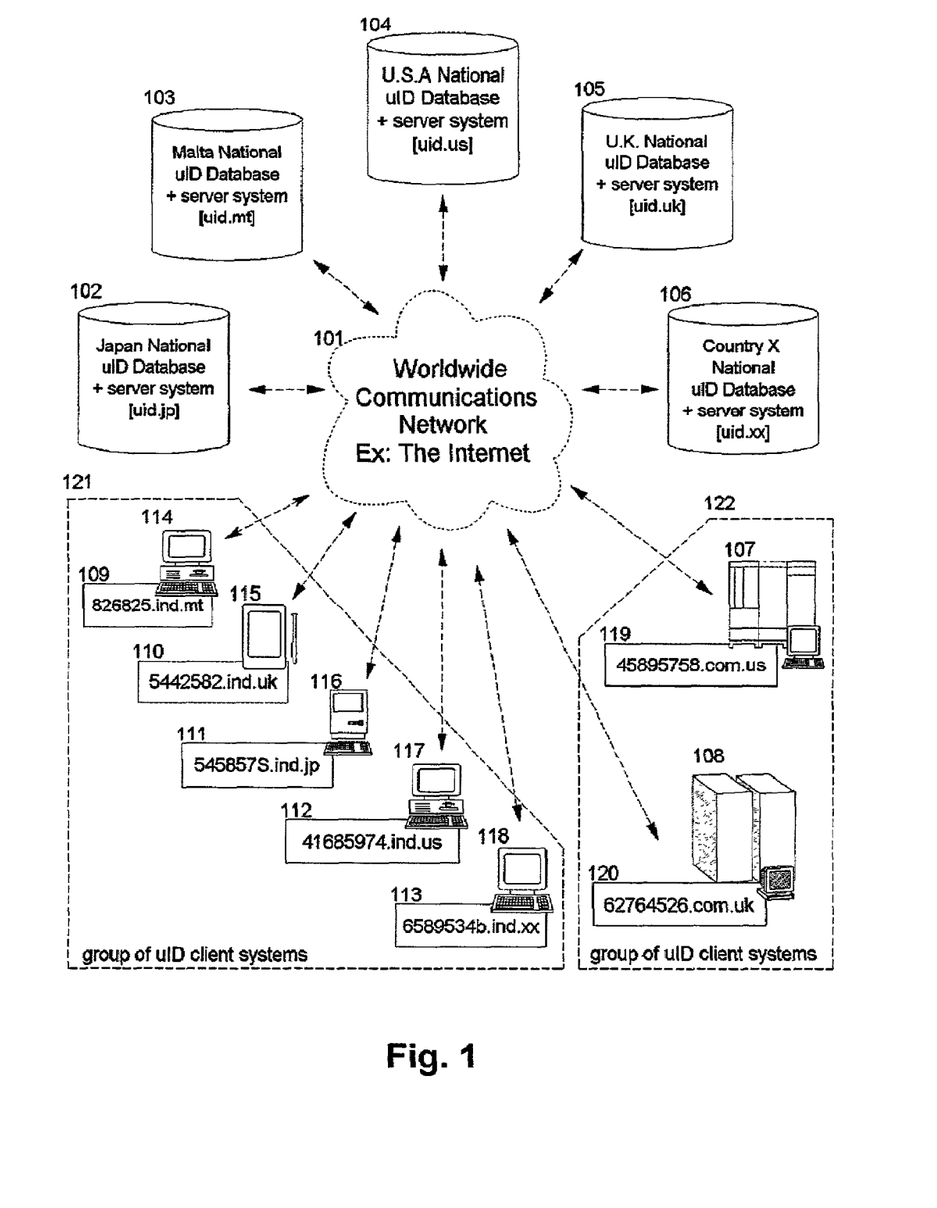
FIG. 1 is a diagram illustrating an embodiment of the present invention's general infrastructure

FIG. 1 illustrates a diagram of an embodiment of the general infrastructure of the present invention. Every participating country in the world hosts its own uID database.

Examples. 102-106 represent these databases in their respective countries. Each of these uID databases is built by using official data from a conventional official database of that country. Official national databases exist in practically every country, the most popular examples are electoral registers, passport, driving license, birth certificate, and ID card databases. These contain a list of all citizens of that country together with other details such as their address, date of birth, sex, and a photograph. A most important feature about this data is the fact that it is normally verified carefully and is as near to authenticity as practically possible. Furthermore, each record's unique number or identifier can be used to build an internationally unique identifier to be called the uID identifier or simply uID. The uID database server that hosts one's uID identifier and its related record may be called one's home uID database server.

A uID database of organizations, such as commercial concerns, could be built in the same way from official trade directories. Any other entity other than people can be included in this uID paradigm. A likely example would be motor vehicles.

Each uID database is connected to a worldwide network such as the Internet 101 through high-speed connections that can handle a huge amount of data traffic. It is very important for the data in the uID database to be synchronized with its official source. Each uID database has to be kept regularly updated, either by a read-only direct link to the official source, or through regular batch updates.

The uID paradigm enables uID records to be sub-divided into entities or uID groups. FIG. 1 displays two types of uID groups. These are individuals 121 and companies 122. Typically, individuals who, in FIG. 1 are represented by their uID identifiers 109-113 communicate and interact with one another using a number of software applications. These applications run on various types of personal devices 114-118 which are connected to the Internet. This, in the industry, is referred to as P2P (Peer-To-Peer). Two very popular P2P applications are Chat, and Instant Messaging. Many individuals also make use of online services offered by online commercial concerns 107 and 108 that are represented by their respective uID identifiers 119 and 120. This is known as B2C or Business-To-Consumer. In turn, commercial organizations 107 and 108 may transact business amongst themselves and this is referred to as B2B or Business-To-Business. All these types of activities would benefit immensely from the convenience of the uID paradigm since they all involve the exchange of respective details. In such situations, every party would like to have peace of mind that it is actually dealing with whoever the other party is claiming to be. By becoming uID users they could, selectively, access each other's details through each other's uID home servers. This would be subject to authorization, which is an essential feature of the uID concept. The actual exchange of details would be transmitted in encrypted form.

The uID Identifier

Typically, official national databases have a unique identifier or key. Examples of these unique keys are ID Card numbers, passport numbers, or driving license numbers. The uID paradigm uses this unique key to build the internationally unique uID identifier. This unique key is part 203 shown in FIG. 2A which illustrates the structure of the uID identifier with its three distinct parts. Since different countries adopt different types of ID identifiers, this part of the uID identifier should allow for an alphanumeric type field, which may be variable in length. A country code 201 is a fixed-length unique country identifier. This can be either numeric or alphanumeric and a list may be created especially for the uID paradigm. However, it would be more convenient and popularly familiar to make use of an established country code standard. It would be most convenient to represent country code 201 by the two-letter, ISO-3166 standard. Most people are already familiar with the Alpha-2-letter code, since they see it all the time in their e-mail addresses and the web sites they regularly visit. Examples of these codes are shown enclosed in box brackets inside uID database representations 102-106 in FIG. 1. The ISO-3166 standard also accommodates a 3-letter code and a 3-digit numeric code. Another numeric alternative to the ISO-3166 country code standard is the international-direct-dialing country code. This is also familiar with many people. The country identifier can be, further appended with, a secondary identifier representing a sub-division of a particular country. This could be anything from a state code to a city code.

Figure 2A:
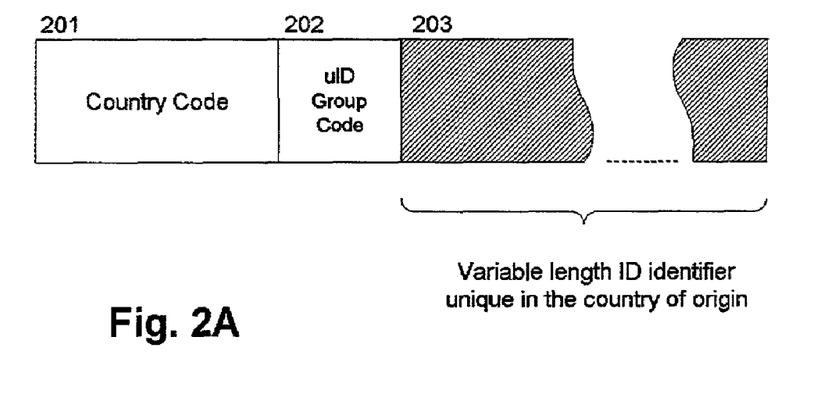
FIG. 2A illustrates the uID identifier's main parts

Concatenating country code 201 and unique key 203 is enough to produce a worldwide unique identifier. However, this would narrow the scope of the present method for identification to identify individuals only. By adding a uID group code 202 the uID identifier would be able to represent other entities, such as commercial concerns and various other types of organizations. Other groups can be added as the need crops up. As with the country code, the uID group code format is not important at this stage. However, as examples, we can have "ind" to represent individuals, "com" to represent commercial entities, "med" for medical establishments, and "air" for airports. Numeric fields could be used to represent the uID group, but that would make things much less user-friendly.

All uID database server systems of the world would need to have their own uID identifiers and digital signatures as well. They should have their separate uID group code such as "uid" but could do without the number part. For example, "uid.us" would be sufficient to represent the uID database server of the United States of America.

Figure 2B:
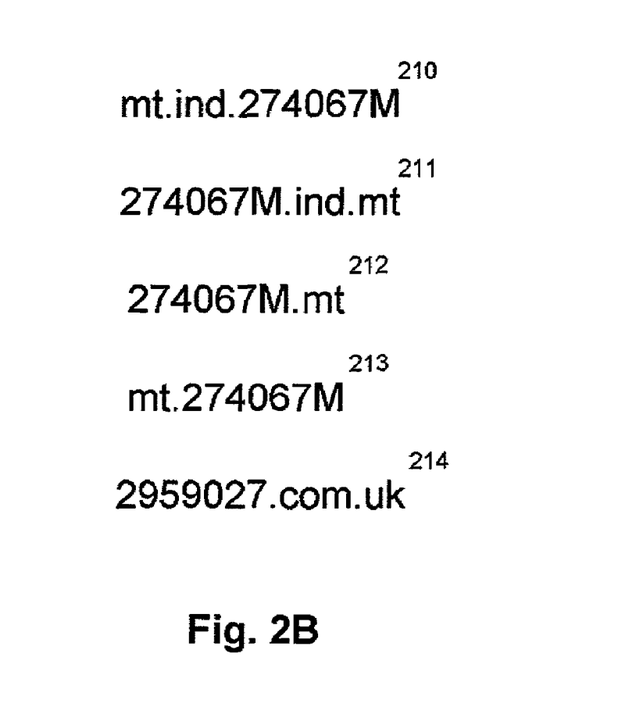
FIG. 2B shows some uID possible format examples

While highlighting the three distinct parts of the uID identifier, it is worthwhile to point out that their sequence as shown in FIG. 2A is not material at this stage. One skilled in the art would appreciate that both the format and sequence of these parts can be rearranged and adapted to accommodate final software specifications. FIG. 2B shows some examples of what the uID identifier may finally look like. All first four example uID formats 210-213 represent a Maltese individual whose Maltese ID card number is 274067M. In examples 212 and 213, the absence of the uID group code signifies an individual since "ind" should be understood to be the default uID group. This offers a convenient shortcut.

For these examples a period (.) has been chosen as a delimiter separating the three uID identifier parts. These delimiters may not be important for uID client and server systems to distinguish each part. This holds true if both the country code and the group code are of fixed length. However, in this case, the delimiter serves to create a more human readable identifier. On the other hand, these delimiters become necessary if two or three parts of the identifier are of variable length. A fifth uID example 214 represents a British company registered in the United Kingdom. Its registration number in the official trade database is 2959027. Its country code is "uk" and its group code is "com".

Figure 2C:
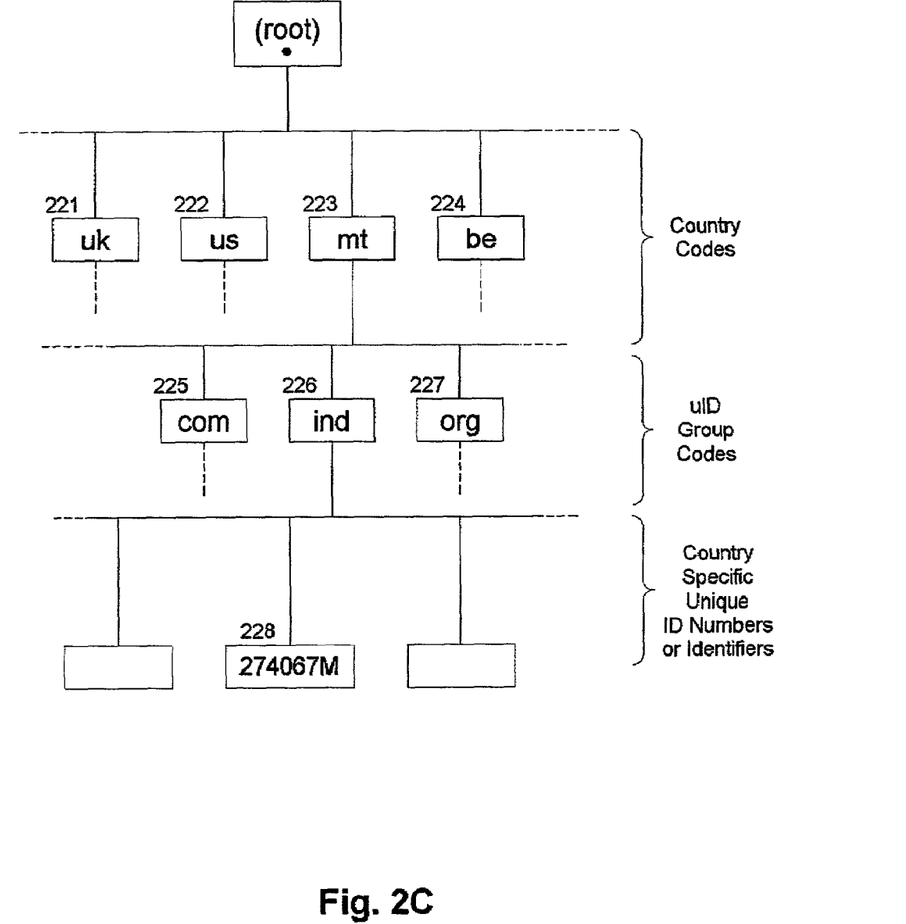
FIG. 2C shows a sample uID identifier structure hierarchy

FIG. 2C illustrates the uID identifier's structure in a hierarchical manner. From root, the top-level domain represents various uID databases hosted by countries that are represented by their ISO country codes 221-224. The next level represents the various uID groups (entities) such as "ind" 226 for individuals, "com" 225 for companies, and "org" 227 for organizations. Each uID group splits into group members. A nationally unique uID identifier 228 represents each one of them.

The uID Database and Server System

Figure 3A:
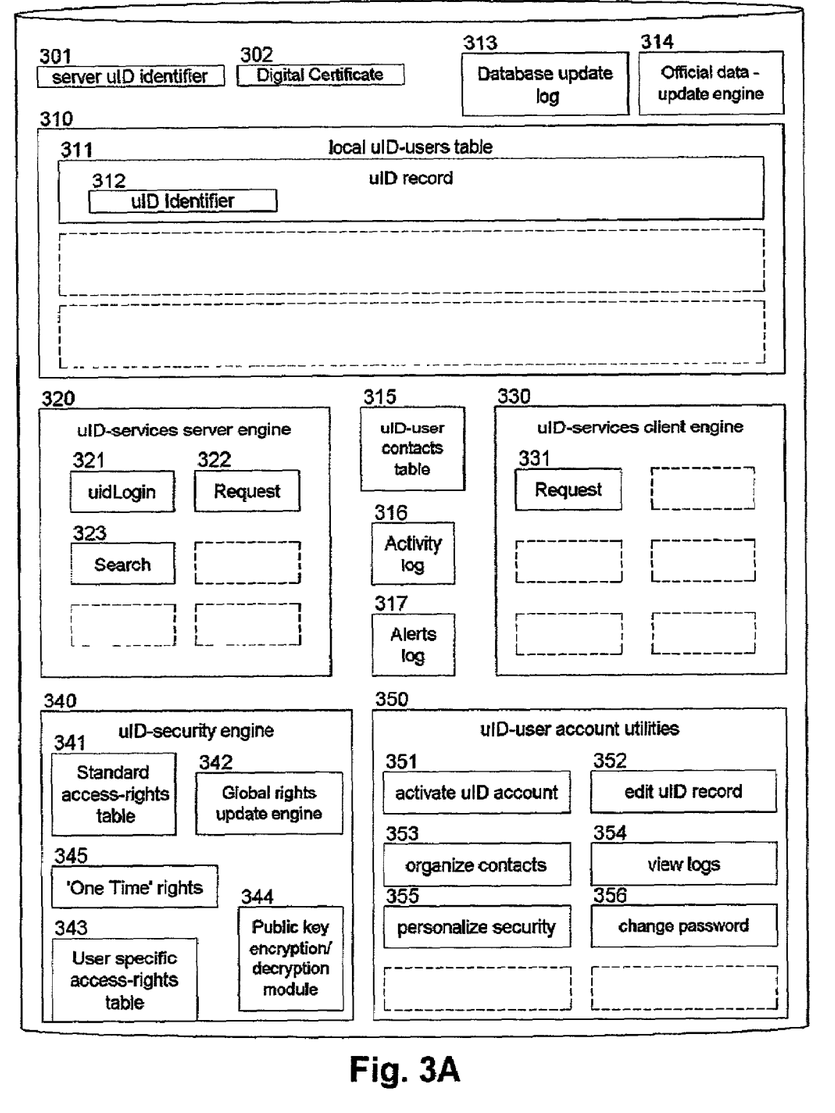
FIG. 3A shows an embodiment of a uID database server and its basic components

FIG. 3A shows a block diagram of a uID database server with its essential components necessary to make the uID paradigm work. This diagram does not show conventional components commonly used in database management such as backup, rollback features, and mission-critical issues, which are essential. Database giants like IBM, Microsoft, and Oracle, all currently offer these and numerous other features that keep a database running twenty-four hours a day, seven days a week.

This database and server system would need to have its own uID identifier 301 and digital signature or certificate 302 since it would also need to authenticate itself. Every country's database would store its local users in a "local uID-users" table 310. A record or row 311 in table 310 represents each uID entity member or user. A uID identifier field 312 acts as an index or key for each record. This identifier conforms to specifications described in FIG. 2A and FIG. 2B. Identity related data in each of these records should be in synchronization with its official source. An update engine 314 achieves this. All updates effected are accounted for in a database-update log 313 to eventually track down who, when and how these where carried out. Since uID entities may not be limited to just individuals, the possibility of having a separate table for each uID group against having one table for all groups should be considered. For the latter, table 310 should be able to accommodate different record definitions, since different uID groups would require different fields of information.

Any uID user would be able to define a list of uID identifiers that represent his regular contacts, and store them in a contacts table 315.

A server engine 320 consists of a number of components that deliver services to any authorized uID user or uID server around the world. A server component 321 provides all uID users with a common login procedure to all uID compliant services on the entire network. In the industry, this is commonly referred to as "Single Sign-on". Another component 322 responds to a "request-for-information" by a uID user or uID server by providing specific information about a particular local uID record to any authorized requester. Another component 323 returns one or more uID records to an authorized uID client system following a search request on criteria based on one or more fields in the uID record.

Other components may be added to server engine 320 if new services emerge. As will be described later, the process of "request-for-information" service 322 involves the uID servers concerned, validating each other uID users' identities. In this case, uID servers act as uID clients as well. For this reason, each uID database server needs a request client component 331. Other components may be plugged into client engine 330 if new services emerge.

A uID security engine 340 has the function of knowing who is authorized to see or use what. It also ensures that the service delivered is of use solely to the intended recipient, even if it is intercepted. A table 341 stores standard access rights dictated by a global uID authority represented by all participating countries. These standard rights are general rules common to all uID servers, and can be all updated from time to time by the global authority through a broadcast update. In each uID server, a special client component 342 handles this update. All communications between server and client components throughout the whole network are encrypted and decrypted by a "Public-Key encryption/decryption" module 344. The uID user can personalize his or her security settings and these are stored in a separate table 343. "One time" rights are rights of access to fields given by any uID user to another uID user for interactive use on a one-time basis only. These rights are time sensitive, and once received by the security engine, are stored in a table 345 and kept there until the specific request for information is received, or until its limited time expires.

A group of utilities 350 help the user to maintain his or her uID user account. An "activate_uID_account" procedure 351 enables a uID user to initiate his account and start using uID services and utilities. This ensures that no stealing of identities takes place. An "edit_uID_record" utility 352 allows some details in his or her uID record to be edited while an "organize_contacts" utility 353 allows the user to add, delete and organize contacts into groups in table 315. A "view-log" utility 354 enables one to see activities carried out involving his or her uID identifier for a specified period of time. Utility 355 lets the user personalize his or her security settings stored in table 343 within the limits of the overall security structure devised by the global uID authority. One can change his or her password by a "change_password" utility 356. Other utilities may be added as the need arises. All utilities mentioned above will be described more extensively at a later stage.

The uID server records all database, services, and utility activities in a tamper-proof activity log 316. It also records any suspected service misuse in an alerts-log 317. This enables administrators or other authorities to act accordingly.

The uID Record

Figure 3B:
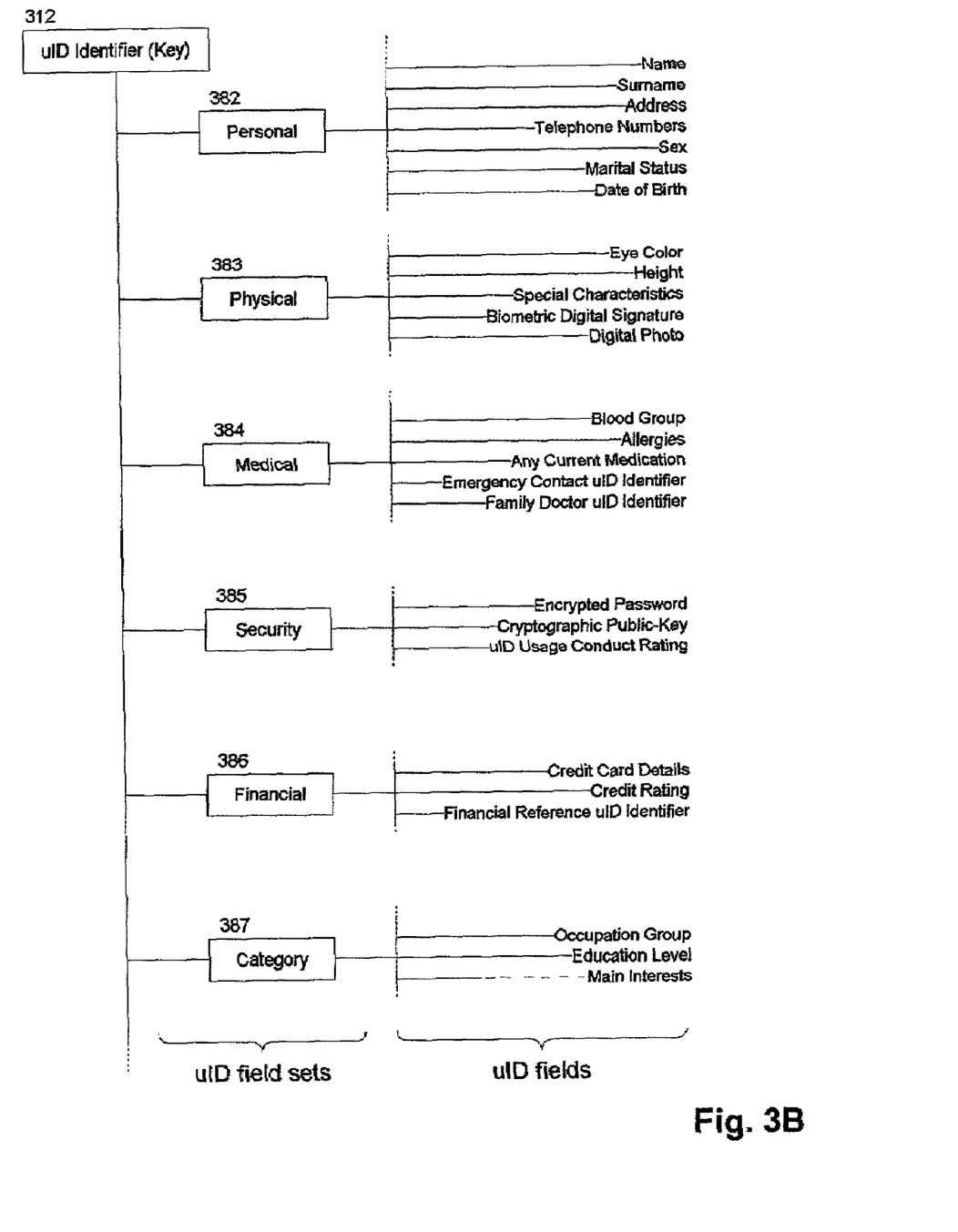
FIG. 3B is a skeleton, hierarchical, uID record definition for individuals (uID group "ind"), illustrating uID field sets

Every individual, organization, or other uID entity member is represented by a single record 311 in the uID database hosted by his, her or its country of origin. FIG. 3B attempts to start building the uID record definition for individuals (uID group "ind"). Every record in every country's uID database will have uID identifier field 312 as its key. In the industry, this is also referred to as a unique index. The fields, whose contents would be brought over from the official data source, should be in synchronization with those same fields in the official source. The purpose of this is to have all the changes effected to the official database to automatically reflect in the uID database. Typically, these fields are name, surname, address, date of birth, and place of birth, among others. It is likely that new fields would need to be added to the uID record definition, which can be updated from other official data sources. The record definition should be flexible enough to allow for further expansion as new urn applications are recognized.

To make enquiries easier, fields in each uID record should be grouped into sets.

Example uID fields sets 382-387 are shown in FIG. 3B. Each uID field set can have a definite list of fields mapped to it. For example a uID field set 382 called Personal, can have fields like name, surname, address, sex and telephone number mapped to it. Another set 383, Physical can have fields like, eye color, height, special characteristics, fingerprint data, and a photograph. A request for information to the uID database server can be submitted in a shorter form of "Give me 274067M.mt's Physical details" instead of "Give me 274067M.mt's eye color, height special characteristics . . . ". Field sets will also make it easier for the uLD user to customize his or her security requirements. Instead of specifying who can access which fields one by one, he or she can say, for example, "I don't want my Financial fields to be accessed by anyone except the following uID identifiers or uID contact groups . . . ". The uID record definition should allow for the creation of new uID field sets in order to accommodate any future uID applications.

Records in the uID database should also be categorized. A number of category fields can be opened under uID field set 387 titled Category, for example Occupation Group. The value of this type of field will be assigned to one selection from a predefined list of possible values. These category fields can later be used as search criteria. As an example, one can round up all medical doctors in a certain area. This feature will also lead to information that is more meaningful when data mining uID databases.

The uID record definition in FIG. 3B is intended only for uID group "ind", i.e. individuals. Different uID groups will obviously be required to have different field definitions and different uID field sets.

The uID record implementation should follow a standard such as the Universal Description Discovery & Integration (UDDI).

Applications for the uID Paradigm

The number of present web-based services or applications that can benefit from conforming to uID is vast. Furthermore, new applications, which were not possible without uID, may well appear. Here is an attempt at imagining but a few.

Any hospital or medical facility around the world would be able to access any uID user's medical data. By being a registered uID organization of uID group "med", the hospital would have automatic rights to access the uID user's medical records. It may also have the necessary rights to update these records as soon as treatment is administered. In this way, one may have up-to-date medical records, readily accessible from anywhere around the globe. This would be especially useful in case of an accident where the patient loses consciousness. If a patient is carrying his or her uID identifier on his or her person, he/she can be instantly identified and his/her emergency contacts and family doctor known and contacted at once. Furthermore, medical staff performing emergency treatment would avoid administering medicines which might be incompatible with any possible allergies of the patient. They would know these details on the spot through mobile computers connected to the Internet. The integration of biometric input devices to these mobile computers would greatly enhance the identification process.

Airports, hotels, and other security sensitive places can make use of uID to confirm identities. An operator may submit a request for an individual's photo to the individual's home uID database using the uID identifier presented. On receipt, the operator compares the face on the computer screen with that of the person in front of him or her. Interfacing this procedure to biometric devices would achieve a higher level of security and convenience. As an example, one can have the individual's fingerprints scanned by a palm reader at the checkpoint. The resulting digital mark is stored locally in volatile memory by the client system. Apart from photo and personal details, the client system in this case, asks the user's home uID database for the individual's digital biometric mark. It then compares the mark received to the one in its local volatile memory. These methods should eradicate the possibility of anyone making use of forged documents to travel, or gain unauthorized access to restricted areas.

The uID paradigm can make worldwide surveys more convenient and cost effective for obvious reasons. It does not discourage respondents with lengthy form filling. Also, certain behavioral patterns are already recorded in the uID database activity logs and would only require the uID user to submit them at his or her discretion.

Criminal investigation can benefit from the worldwide use of uID since a person of any nationality can be identified from his photo in a few minutes or even seconds. A "search for uID identifier", using the photo field as search criteria is submitted to all countries' uID databases. In the industry, this is known as a broadcast message. Each individual uID database executes its own search by matching the supplied photo with all the photos on file and replies with its search results, which could turn out to be an exact match or a list of likenesses.

With just his or her uID identifier, password, and/or digital biometric signature, one can quickly become a member of any uID compliant website or service. When authorizing the access of his or her credit card details through the uID database server, the user is confident that the vendor is that who he/she claims to be. This is because the user knows that an important part of the procedure that submits any of his/her details, is the verification of the other party's uID identifier.

Any uID user has his/her "usage conduct status" updated according to his/her activity history while using uID services. In this way a scheme can be set up where, for example one can feel safe dealing with a "5 star" user and be wary of a "1 star" user. This could be a deterrent to bad behavior.

The uID Services and their Delivery

Developers can build uID compliant applications around a library of standard uID services. They should ensure that the software components that perform these services meet specifications laid out by the uID global authority. This authority must certify these components and approve their use either directly or through its national branches. These components together with their documentation should then be made available to web services developers that wish to integrate them in their web applications. Each service does a specific job. This is fundamentally the transmission of selected data from the uID record through secure messages between authorized uID client and uID server systems. Standard protocols should be implemented here as well. One such emerging protocol is a technology called Simple Object Access Protocol (SOAP), which is a specification for using Extensible Markup Language (XML) in simple message based exchanges.

These messages must be delivered in a way that can only be decrypted or untangled by the intended receiver that has a necessary digital secret. There are presently various technologies that do this, but the system chosen must succeed from the very beginning, since it must instill confidence. One very secure form of cryptography that can be used is called Public-Key Cryptography, an example of which is OpenPGP; an encryption standard endorsed by the Internet Engineering Taskforce Another example of secure communication technology is Secure Sockets Layer (SSL).

Figure 4:
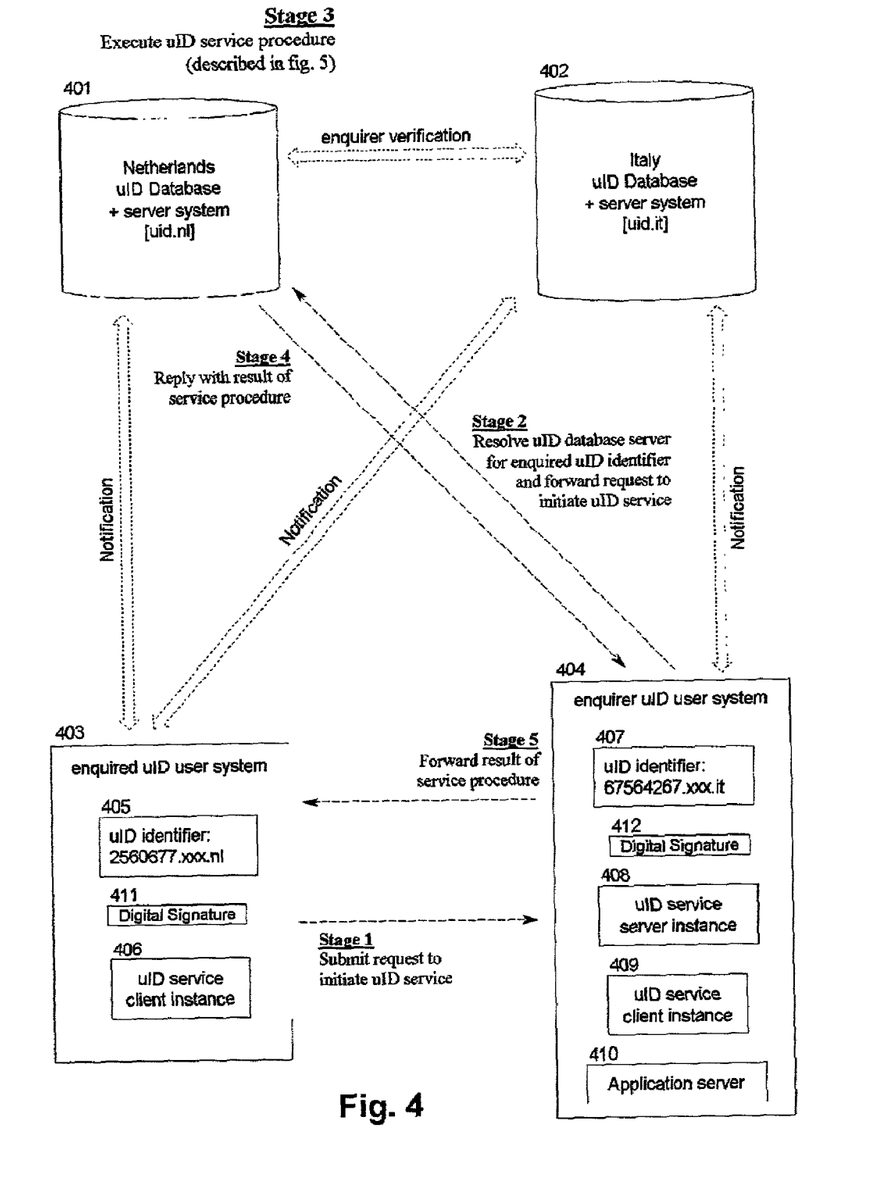
FIG. 4 is a block diagram generally detailing the various stages of delivering any uID service
Figure 5:
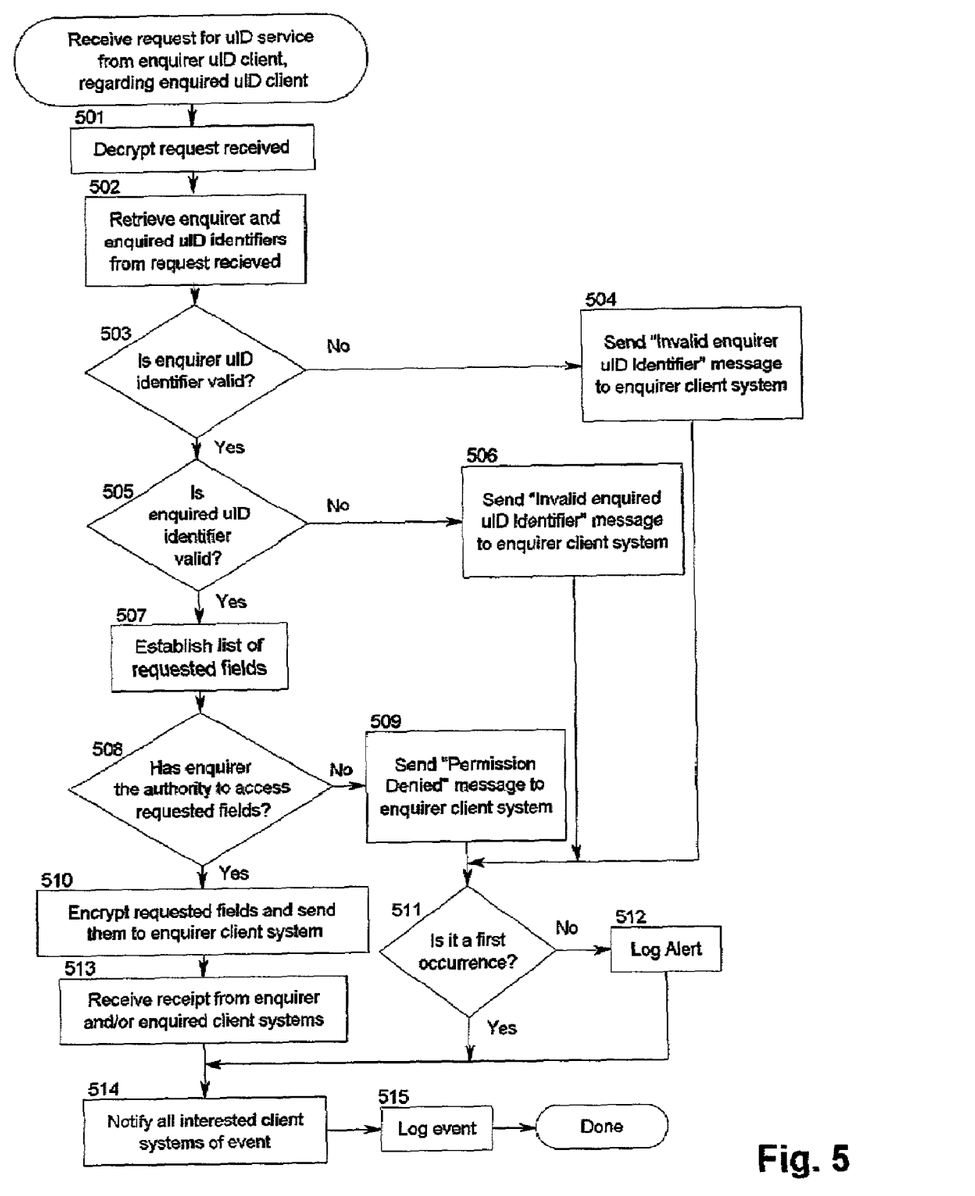
FIG. 5 is a flow diagram of a general procedure by which a uID server system delivers a service to a uID client system

FIGS. 3A, 4 and 5 help to explain the delivery of all services. At this point, it is necessary to distinguish between the terms "user" and "uID user" as referred to in this document. The term "user" refers to any user of online services, for example anyone making use of "Hotmail", "Yahoo" or "Netscape" mail. A "uID user" is anyone making use of uID services or utilities and who is authenticated by his, her, or its uID identifier and digital secret/s or signatures. In this case, a uID compliant web server, and its users are all considered "uID users". The delivery of any uID service or transaction involves at least two uID users. To distinguish between them, we shall refer to user system 403 as the "enquired" uID user and web server system 404 as the "enquirer" uID user, since it is server 404 who is enquiring about user 403. A combination of a uID identifier 405 and a digital signature 411 is used to authenticate enquired 403 while a combination of a uID identifier 407 and a digital signature 412 is used to authenticate enquirer 404.

To start accepting requests for uID services by enquired system 403, enquirer system 404 needs to integrate the proper server component 408 for each uID service. To make use of any uID service, user system 403 needs the proper client component 406 residing in his or her system 403. Instance of client component 406 is either preinstalled in enquired system 403 or else an application server 410 sends it over through the network when needed. In the latter case, system 403 would be referred to in the industry as a "Thin client".

FIG. 4 with the help of FIG. 3A, and FIG. 5 illustrates the general sequence of events in the supply of a uID service. In stage 1 of FIG. 4, enquired system 403 submits a request to initiate a uID service to enquirer client system 404. Both systems can be from any uID group. In certain cases, enquirer 404 may have permission to initiate a service regarding enquired 403 without enquired's request. In this case, stage 1 in FIG. 4 is not necessary. In stage 2, enquirer client 409 uses the country part of enquired uID identifier to resolve his or her home uID database server 401. Once uID server has been successfully resolved, enquirer sends to it a message requesting it to execute the required service procedure, described in FIG. 5. This message should contain both enquired and enquirer uID identifiers 405 and 407. Enquired's home uID database server 407 needs both these identifiers for verification and logging purposes. The service procedure in FIG. 5 needs enquirer's uID database server 402 to verify its uID identifier and to check its rights to the service. This all happens in stage 3. In stage 4, uID server 401 sends the result of the service procedure to enquirer 404 . Stage 5 sees enquirer 404 acting upon these results to interact with enquired 403. For a higher security service, enquired 403 may notify home uID server 401 of his or her intention to initiate a service regarding enquirer 404. The service result is delivered to enquirer, only if uID server 401 has received and verified this notification. When the service is actually delivered to enquirer, server 401 in turn notifies the enquired of this event. Users can switch on and off these notifications according to their preferences for levels of security but limited by global security standards laid out by the uID global authority.

FIG. 5 features a flow diagram of a general procedure followed by uID server components 321 , 322, and 323 to deliver uID services. A request for service is received from enquirer client system 404. Request is decrypted using security component 344 in step 501 . Step 502 retrieves enquirer and enquired uID identifiers 405 and 407 from decrypted request. Step 503 validates enquirer uID identifier 407. Sending a "request for information" to enquirer's uID home server 402 does this. In this way, enquired's home uID server 401 now becomes a uID client of enquirer's home uID server 402. This is why a uID server needs to have a uID identifier and a digital signature of its own. If result received from this event is negative, step 504 is executed next, which is the sending of a message like"Invalid Enquirer uID Identifier" to enquirer client system 404. If result is positive, enquired uID identifier 405 is verified next, in step 505. This time, it is a local user and hence, uID server 401 looks up enquired's record in its own uID database table 310. If the result is negative, step 506 sends a message like "Invalid Enquired uID Identifier" to enquirer 404. If the result is positive, step 507 comes next establishing the information that is needed by enquirer 404 about enquired 403. This could be in the form of one or more fields or it could also be in the form of one or more field sets, described earlier in FIG. 3B.

Single sign-on or "uIDLogin" component 321 may be asked a question like "Is this password for this particular uID identifier correct?" In step 508 it is established whether enquirer has the necessary rights to have access to this information. This decision is based on information in security tables 341, 343 and 345 found in both enquirer and enquired uID database servers. If enquirer does have the necessary rights, the field contents requested are encrypted and sent to enquirer 404 in step 510. If the necessary rights do not exist, step 509 sends a message like "Permission Denied" to enquirer 404. Step 513 may be especially useful when delivering high security services. It receives and records a message from enquirer and/or enquired systems confirming that they have actually received the requested service. Additionally, it can form the basis of a non-repudiation function. This means that occurrence of event cannot be denied later. Next comes step 514 where enquired is notified of event. This may or may not happen depending on the particular client system's personal settings. In sensitive issues, however, these settings may be overridden.

All exception steps 504, 506, and 509 lead to step 511 where it is established whether any of these exceptions have occurred for the first time. If any one of these exceptions occurred previously, then step 512 is executed which is the logging of an alert record in a special log file 317. Any disciplinary action resulting from the examination of this alert may affect uID user's conduct record. This is stored in a field "uID Usage Conduct Rating" shown in FIG. 3B under field set 385 titled "Security". If it is the first time that this has happened, then the procedure moves on to notify enquired client system and logs the event in steps 514 and 515. These events are posted in a special activity log file 316. The procedure in FIG. 5 is high level and serves only to illustrate as clearly as possible the concept behind the delivery of uID services. This procedure can be refined on the drawing up of detailed software specifications.

The following is a suggested list of core uID services. The list is by no means definite. Other services can be added if new uses for uID are recognized.

Login a uID User

Server component 321 is responsible for a single sign-on service. Typically, web server systems and server systems in local and wide area networks, subscribe a list of users in the form of the users' login names and passwords. They store these login names and passwords in a special password file. When a user's client system needs to login, it submits the user's login name and password to the server. The user is then granted or denied access depending on whether the combination of user name and password submitted exist in the password file. In the case of uID user 403 logging into uID enabled web server 404, the following are the general stages executed.

In Stage 1, the client component 406 collects from the user his uID identifier together with his password or biometric signature, and submits these in an encrypted message to the uidlogin server component 408 in web server 404. The encrypted message can be submitted in such a way as to allow web server 404 to decrypt his user's uID identifier and his or her request but not the password or biometric signature. Encapsulating password or biometric signature in a separate encryption that is intended solely for enquired user's home uID-server 401 could achieve this.

In Stage 2, web server 404 uses the country code in user's identifier 405, ("nl" in our example) to resolve his or her home uID server 401 (The Netherlands in our example). It then sends a "Request-for-information", (described in more detail in the next section) to uID server 401. To do this it uses a client component 409 and its uID identifier 407. The uidLogin function is in effect a "Request for information" call since, in this case, the information requested is whether enquired is truly who he/she claims to be. This "Request for uID user information" is an encrypted, time sensitive message asking something like "I am a web server and a uID client and my uID identifier is 67564267.xxx.it. I have received a request for login from uID user 2560677.xxx.nl. Is this enclosed password or biometric signature that he submitted to me, valid?" (xxx in the example-identifiers stand for any uID group).

We come now to Stage 3, where uID server 401 executes the uID service procedure. In this case, server component 321 follows the flow chart steps in FIG. 5 to verify the validity of the received password or biometric signature and to decide on its response to enquirer 404. One of these steps involves uID server 401 to itself resolve enquirer's home uID server 402 from received uID identifier 407 and submits to it a request for information to verify the enquirer system's identity and authority.

In Stage 4 uID server 401 replies with a "Yes" or a "No". In Stage 5, the web server system 404 grants or denies access to system 403, according to the reply in Stage 4. This yes/no reply from uID server 401 will not be given, however, if any one of the two uID identifiers are invalidated by any of the uID server systems involved 401 and 402. In this case, an appropriate message is sent to both or either parties depending on factors like which uID identifier is invalid, security standards of global uID authority and personal preferences of either party. If user 403 is logging in web server 404 for the first time, server might effect another request for information to user's home uID server 401. The purpose for this would be to acquire more details that web server 404 might need in order to open a new account for user 403. Provided that web server 404 has the necessary rights, uID server 401 replies with these details.

In this entire procedure, web server 404 acts as both a server and a client. It is a server for client system 403 and acts as a client for uID server 401. Similarly, uID server 401 is a server for web server 404 and a client for uID server 402.

In another embodiment of this service, user's client system 403 notifies its home uID server system 401 of its intention to login to web site 404. It sends a time sensitive message to its home uID server 401 in the form of—"I am user 2560677.xxx.nl and this is my password or biometric signature to authenticate myself. I want to login to web site 67564267.xxx.it" At the same time, it sends another time sensitive message to web site 404 to inform it of its intention. After successfully verifying user's uID identifier 405 and password or biometric data, user's home uID database 401 sends a consenting message to web site 404 which is also time sensitive. This message can be in the form of—"I am uID server uid.nl and my client 2560677.xxx.nl has just successfully authenticated himself and needs to log into your web site." On receipt of both messages within their expiry period of time, web server 404 logs in uID client system 403 and sends to it a message to inform it of the completed operation.

Request for uID User Information

Server component 322 takes care of a request for information service. Any uID user can request information about any other uID user. Whether that information is delivered or not depends on the uID user's rights on the other user's particular fields or field sets requested. These rights can be automatically pre-set by default according to rules and laws of the global uID authority. Additionally, any uID user can be allowed to customize some of his/her personal security settings. For example, the authority might dictate that anyone could enquire and get to know the name and address of any particular uID identifier. However, uID users may choose not to give away their address to anyone but some selected individuals or groups in their contact list. The global uID authority might allow special rights to special uID groups on particular uID fields or field groups. For example, medical organizations may view anyone's medical records. Additionally, any uID user may give rights on some of his or her fields or field groups to another uID user on a "One Time" basis. For example enquirer 404 needs to know enquired's credit card number and expiry date for one particular transaction. The following is one way of doing this in a secure way. Enquired 403 sends a message to home uID server 401 declaring that he/she wants to make available specific fields or field sets to enquirer 404. When server 401 receives and validates this message, it posts a time sensitive entry in "One Time" rights table 345. Table 345 holds this entry until it expires or until awaited request from enquirer 404 arrives. In the former case, entry is deleted, while in the latter, the requested information is delivered to enquirer in the same steps described above and in FIGS. 4, and 5. After delivering the service, the "One Time" record is deleted.

Search for uID Record

Server component 323 takes care of a search service. It follows the steps in FIG. 5 to receive, decrypt, and verify requests by enquirer 404 to search for uID records. In contrast with the other two services described, in this case, only enquirer 404 initiates a request for a search. Results returned from this service may be in the form of one or more uID identifiers, whose uID records satisfy the search criteria in enquirer's request. Search criteria may be any field or fields in the uID record, provided enquirer has access rights to those particular fields. An example would be for enquirer to ask a particular uID server to return all uID identifiers in its database, whose ages are between 18 and 25, who have college education and who are not presently employed. Another example would be for the enquirer to submit a digital photo as search criteria and uID server returns an exact match or a list of likenesses. This last example would be immensely useful in security applications. To execute a worldwide search, the enquired's system must replicate its request to uID servers of all countries in a broadcast message. This may be a very fast way to identify anybody anywhere in the world.

uID User Account Maintenance and Utilities

These maintenance functions and utilities involve the interaction between any uID user and his home uID server for user account housekeeping purposes. These include the changing of login password, the editing of some fields in the uID record and the setting up of personal security parameters.

Activate uID Identifier

When set up, each country's uID database will contain all its officially registered persons. However, to start making use of his/her uID identifier, one must first activate one's uID user account. This is primarily a security measure. There are many possible ways to do this and there is no limit to the types of challenges that may be employed. This is an attempt at an example mainly to outline the idea behind this utility.

The user logs into his country's uID server for the first time through a secure connection, and submits his/her uID identifier. Through a suitable form, this utility should present the user with randomly selected authentication challenges such as the interrogation of personal information. This information can include his/her date of birth, mother's name, and maiden surname among other details. Upon the entering of the correct information, the utility randomly generates a password, which the user then receives at his/her residential address in a sealed envelope. Most banks use this method to send credit card pin numbers to their clients.

As soon as the user receives his/her password, he/she is encouraged to change it before starting to use any uID services. If the present method and system will be using Public-Key Cryptography mentioned earlier on, the uID user will need to execute a procedure that will generate his/her private key. The public key would be in the user's uID record in the uID database. Other uID users need this public key to transmit encrypted data intended only for that user. The private key should be stored somewhere safe. An ideal example would be a popular, small storage medium that the user can carry conveniently, such as a smart card or token. One can use it wherever and whenever he/she needs to access a uID based service. If this method and system adopts biometric devices interfaced with uID procedures, the person would be required to visit his or her country's uID premises to have his or her fingerprints, iris, face, etc., scanned. The digital result of this scan would then be stored in the individual's uID record and could also be used as one of the variables in the procedure to generate his/her private key.

In the case of a company or organization, uID identifier activation should be a more elaborate process. It should have verifications and challenges that are more thorough.

A uID record that has not yet been activated can have its details enquired by another uID user, depending, of course, on access rights.

Edit uID User Record

This service allows any uID user to amend the contents of certain fields in his/her uID record. He/she can normally do this through an on-line form.

This utility cannot allow any uID user to amend all field values however. As an example, changes to his name, address, photo, and other identity related details must only be effected through the proper channels according to rules laid out by the global uID authority. These rules would also be dependent on the individual country's legislation as well as international law. This ensures the authenticity of records and identities.

Change Password

A user's home uID server should offer the user the facility of changing his/her login password. It is extremely important that one highlights the fact that this password may be used universally to login to any uID compliant server system and therefore it is necessary to change this password regularly. In this context, it is also appropriate to underline the use of biometrics and public key encryption in conjunction with this universal password.

Create and Maintain a List of uID Contacts

A uID user should have the facility to create a list of personal contacts in the form of their uID identifiers. This list should be categorized into uID contact groups. That should render personal security and other settings and rules easier to define and manage. Furthermore, applications that make use of standard uID services can use this group to offer features that are more flexible. Examples of uID contact groups would be "Friends", "Family", or "Business Contacts".

Set Personal Security Settings

On creation, the uID record will be assigned with default field accessibility. For example, by default, "med" groups that can represent hospitals and other medical facilities may have automatic rights on 'Medical' field set 384. Airports may have automatic rights to 'Personal' 382 and 'Physical' 383 field sets. The uID user may then be able to customize what fields in his/her uID record he/she wants to make accessible and by whom. These settings may be effected at the field or field set level. Of course, there are certain limits to the extent that this can be done, since certain fields should not be barred from the access of certain authorities. The uID user should have the facility to set business rules like, I want nobody to access my telephone numbers except for the uID user groups "Friends" and "Family".

As mentioned earlier, the uID client system can notify and be notified of uID services that involve his or her uID identifier. In the case of low-security and frequent services, these notifications may prove annoying. The uID user should therefore be provided with the facility of modifying the settings of notifications according to his/her needs. One may want, for example, to switch on notifications when an enquirer asks for one's financial details, but not when he/she attempts to login in a uID compliant server.

View Activity Log

All activities in the uID database are recorded in the activity log as described in steps 512 and 515 in FIG. 5. It would be convenient for the uID user to have a facility for executing a comprehensive query on the list of activities involving his/her uID identifier. This can be in the form of questions such as "Who asked for my personal details between a <date range> or on a particular <time>?"

Conclusion, Ramifications, and Scope

Accordingly, the reader will see that the method for online identification of the present invention can be used to submit one's details easily around the globe, makes use of existing resources and can see its acceptance and adoption spread quickly. In addition, it has the added advantage of higher reliability and security by distributing load and responsibility. Most importantly, it offers a novel and better alternative to current initiatives, which are in a stalemate situation due to their rivalry and lack of interoperability.

Although the present invention has been described in terms of various embodiments, it is not intended that the invention be limited to these embodiments. Modifications within the spirit of the invention will be immediately apparent to those skilled in the art. For example, uID services can be made to handle more than one enquired uID client system at any one time.

One skilled in the art would appreciate that one can use the uID paradigm in various environments other than the Internet. Various communication channels may be used such as local area and wide area networks. A uID server system may be any combination of hardware or software that can deliver uID services in response to a uID client request. A uID client system may be any combination of hardware or software that can interact with the server system.

What is claimed is:

1. A system for providing an infrastructure for trusted universal authentication and secure services over a worldwide communications network comprising:
   (a) a plurality of participating geo-political regions
   (b) a local authority for each said geo-political region
   (c) a unique region identifier representing each said geo-political region
   (d) at least one collective entity falling under jurisdiction of each said geo-political region whose members are to be universally authenticated and to be offered secure services
   (e) a unique identifier representing each said collective entity (hereinafter, the "uID group code")
   (f) access to at least one officially verified data source covering substantially all of said members of said collective entity in each said geo-political region comprising
      (i) access to a unique identifier representing each said collective entity member (hereinafter, the "base ID")
      (ii) access to officially verified data consisting of a plurality of fields of information describing said entity member, mapped to said base ID
   (g) a local server system (hereinafter, "uID server") set up and maintained by each of said local authorities and coupled to said worldwide communications network comprising:
      (i) a database comprising a record for each one of said collective entity members
      (ii) a data importation process for importing said base ID and said officially verified data from respective said officially verified data sources into respective said records of said database
      (iii) a conversion process for converting said imported base IDs to a universal format by attaching to each, their respective said unique region identifier and said uID group code, thereby creating a unique universal identifier (hereinafter, "uID") representing said collective entity member thereby creating a uID member
      (iv) a mapping component for mapping to said uID at least one digital secret known only to said uID member
      (v) a server engine comprising at least one server component offering a particular information service regarding said uID members
      (vi) a client engine comprising at least one client component enabling the request and the receipt of said particular information service from counterpart said server component and/or counterpart said server component of said uID server of any other said geo-political region
      (vii) a unique server identifier
      (viii) at least one digital secret mapped to said unique server identifier
   (h) a multitude of client systems (hereinafter, "uID clients") coupled to said worldwide communications network, each comprising:
      (i) means for accepting input comprising said uID of any said uID member (hereinafter, the "enquirer")
      (ii) means for accepting input comprising said digital secret of said enquirer
      (iii) memory for storing said enquirer's uID and said digital secret for the duration of use
      (iv) means for accepting input comprising said uID of any said uID member to be enquired upon (hereinafter, the "enquired")
      (v) a routing component for resolving said uID server hosting said record of said enquired (hereinafter, the enquired's "Home uID Server") indicated by said unique region identifier in said enquired's uID
      (vi) a request and receipt component for submitting to said enquired's home uID server, a request for information mapped to said enquired's nID in the form of one of said information services available from said enquired's home uID server's engine, authenticated by said enquirer's uID and said digital secret stored in said memory
   whereby said uID members can submit any of their respective said fields of information to other said uID members without the burden of filling in forms
   and whereby substantially all of said collective entity members are registered automatically thereby encouraging rapid and widespread adoption of said system.

2. The system of claim 1 wherein said collective entities are instances selected from a group consisting of people and commercial entities and organisations and airports and medical establishments.

3. The uID server system of claim 1, further including a security engine comprising at least one security means for enabling said uID servers and said uID clients to establish a secure channel of communication between them, including the use of respective said uIDs and said digital secrets thereby ensuring that said information services requested really originated from claimed said uID client and that said information services reach intended said uID client in a form of use solely to said uID client, in case delivery is intercepted.

4. The security engine of claim 3 wherein said security means includes a technology selected from the group consisting of Public Key Infrastructure (PKI) and Secure Sockets Layer (SSL).

5. The security engine of claim 3 further including:
   (a) storage means for storing standard access rights to said data in said database as established by said local authority
   (b) rights customization component for enabling said uID member to create uID member-specific access rights to respective said record but within limitations set by said standard access rights
   (c) second storage means for storing said uID member-specific access rights.

6. The system of claim 5 wherein said information services include an enquiry service for allowing said enquirer to request information on said enquired, if authorized according to said standard access rights and said uID member-specific access rights.

7. The system of claim 5 wherein said information services include a search service for searching for at least one said uID member matching a given search criteria, if authorized according to said standard access rights and said uID member-specific access rights.

8. The system of claim 5 further including a governing authority that is represented by said geo-political regions to agree upon said standard access rights and establish specifications comprising standard technologies in order to guide the development and integration of said uID servers and said uID clients thereby ensuring interoperability.

9. The system of claim 8 wherein said security engine further includes a rights update component for receiving and implementing updates to said standard access rights that may be established and published on said worldwide communications network by said governing authority from time to time.

10. The system of claim 8 wherein said standard technology includes technologies selected from a group consisting of XML (Extensible Markup Language). and UDDI (Universal Description Discovery and Integration).

11. The local server system of claim 1 further including an update component for enabling said data in said database to be in synchronization with said officially verified data source, thereby reflecting any changes in said officially verified data source.

12. The system of claim 1 wherein any said geo-political region is further sub-divided into a plurality of smaller geo-political regions and wherein said unique region identifier also includes a unique identifier representing each one of said smaller geo-political regions.

13. The system of claim 1 wherein said geo-political region is a state within the United States of America and wherein said unique region identifier is a combination of a standard unique identifier representing said United States of America and a standard unique state identifier representing said state, thereby enabling said uID to be internationally unique.

14. The system of claim 1 wherein said geo-political region is a state within the United States of America and wherein said unique region identifier is a standard unique state identifier representing said state, thereby enabling said uID to be nationally unique.

15. The system of claim 1 wherein said information services include a single sign-on service for receiving and checking validity of a combination of said uID and said digital secret pertaining to said enquired from said enquirer thereby authenticating said enquired and authorizing said enquired to sign-on a service hosted by said enquirer on said worldwide communications network.

16. The system of claim 1 wherein the absence of said uID group code in said uID implies a predetermined said collective entity, thereby providing a convenient shortcut.

17. The system of claim 1 wherein one of said collective entities is people and wherein one of said officially verified data sources is an established data source selected from the group consisting of an official ID card database and a passport database and a driving license database and an electoral register database and a birth certificate database.

18. The system of claim 1 wherein one of said collective entities is commercial organizations and wherein one of said officially verified data sources is an official trade directory.

19. The system of claim 1 wherein said digital secret includes an instance selected from the group consisting of passwords and digital signatures and biometric data associated with said uID member.

20. The uID client of claim 1 wherein said means for accepting input of said digital secret includes a device selected from a group consisting of fingerprint readers and face scanning and recognition devices.

* * * * *